(12) United States Patent
Tomonari et al.

(10) Patent No.: US 11,545,865 B2
(45) Date of Patent: Jan. 3, 2023

(54) ROTATION POSITION DETECTION DEVICE FOR A ROTATING ELECTRICAL MACHINE

(71) Applicant: TDK Corporation, Tokyo (JP)

(72) Inventors: Toshio Tomonari, Tokyo (JP); Noritaka Chiyo, Tokyo (JP); Koji Mitake, Tokyo (JP); Toshihiro Kuroshima, Tokyo (JP)

(73) Assignee: TDK Corporation, Tokyo (JP)

( * ) Notice: Subject to any disclaimer, the term of this patent is extended or adjusted under 35 U.S.C. 154(b) by 148 days.

(21) Appl. No.: 17/015,687

(22) Filed: Sep. 9, 2020

(65) Prior Publication Data

US 2021/0111604 A1 Apr. 15, 2021

(30) Foreign Application Priority Data

Oct. 11, 2019 (JP) .............................. JP2019-187674

(51) Int. Cl.
*H02K 3/28* (2006.01)
*H02K 21/14* (2006.01)
*H02K 11/25* (2016.01)
*H02K 11/225* (2016.01)
*H02K 11/00* (2016.01)
*H02K 11/21* (2016.01)

(52) U.S. Cl.
CPC ........... *H02K 3/28* (2013.01); *H02K 11/0094* (2013.01); *H02K 11/21* (2016.01); *H02K 11/225* (2016.01); *H02K 11/25* (2016.01); *H02K 21/14* (2013.01)

(58) Field of Classification Search
CPC ...... H02K 3/28; H02K 11/0094; H02K 11/21; H02K 11/225; H02K 11/25; H02K 21/14; H02K 11/26; H02K 11/30; H02K 24/00; H02K 29/12; H02K 1/27; H02K 21/12; G01D 5/14; G01D 5/245; H01F 2017/0073
USPC ........................................................ 310/68 C
See application file for complete search history.

(56) References Cited

U.S. PATENT DOCUMENTS

| | | | | |
|---|---|---|---|---|
| 5,815,091 A | * | 9/1998 | Dames ................. | G01D 5/2073 340/870.34 |
| 5,872,408 A | * | 2/1999 | Rakov .................. | G01D 5/2412 310/68 B |
| 6,522,128 B1 | * | 2/2003 | Ely ........................ | G01D 5/204 324/207.17 |

(Continued)

FOREIGN PATENT DOCUMENTS

| | | |
|---|---|---|
| JP | 2009-098050 A | 5/2009 |
| KR | 10-2016-0031827 A | 3/2016 |
| WO | WO-2019/102591 A1 | 5/2019 |

*Primary Examiner* — Ahmed Elnakib
(74) *Attorney, Agent, or Firm* — Faegre Drinker Biddle & Reath LLP

(57) ABSTRACT

A rotating electrical machine includes a stator, a rotor with a permanent magnet, a first number of one or more first coils, and a second number of one or more second coils. The second number is different from the first number. The one or more first coils are disposed on the stator. The one or more second coils are disposed on the rotor. The one or more first coils and the one or more second coils are disposed on the stator and the rotor, respectively, in such a manner as to closely oppose each other in a state where the rotor is at a predetermined rotation angle position. The one or more first coils are arranged to induce a voltage in response to a relative position with respect to the one or more second coils.

9 Claims, 9 Drawing Sheets

(56) References Cited

U.S. PATENT DOCUMENTS

| | | | |
|---|---|---|---|
| 2011/0109304 A1* | 5/2011 | Suzuki | H02K 24/00 324/207.25 |
| 2013/0082692 A1* | 4/2013 | Howard | G01D 5/2266 324/207.15 |
| 2016/0079839 A1* | 3/2016 | Shim | H02K 37/14 310/49.01 |
| 2020/0295694 A1 | 9/2020 | Miyama et al. | |
| 2021/0063206 A1* | 3/2021 | Ausserlechner | G01B 7/30 |

* cited by examiner

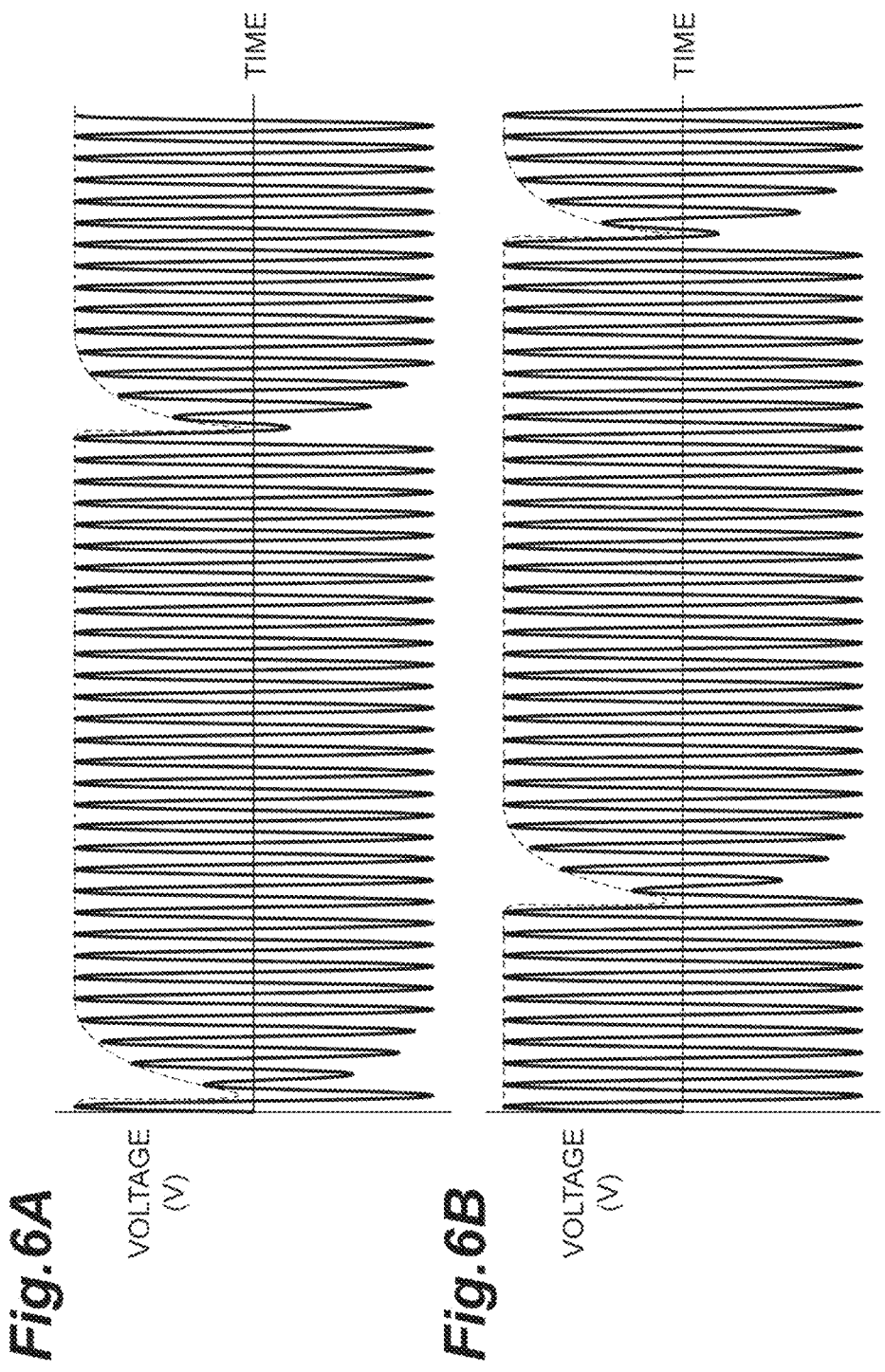

ROTATION POSITION DETECTION DEVICE FOR A ROTATING ELECTRICAL MACHINE

BACKGROUND OF THE INVENTION

1. Field of the Invention

One aspect of the present invention relates to a rotating electrical machine.

2. Description of Related Art

Known rotating electrical machines include a stator and a rotor with a permanent magnet, and known rotation position detection devices are arranged to detect a rotation angle position of the rotor (for example, see Japanese Unexamined Patent Publication No. 2009-098050).

SUMMARY OF THE INVENTION

The rotation position detection device includes a rotor fixed to a rotary shaft of the rotating electrical machine and a stator opposing the rotor. Therefore, a unit including the rotating electrical machine and the rotation position detection device should to be increased in size.

An object of one aspect of the present invention is to provide a rotating electrical machine that is capable of detecting the rotation angle position of a rotor and prevents from an increase in size.

A rotating electrical machine according to one aspect includes a stator, a rotor with a permanent magnet, a first number of one or more first coils, and a second number of one or more second coils. The second number is different from the first number. The one or more first coils are disposed on the stator such that each coil axis of the one or more first coils extends along a rotation axis direction of the rotor. The one or more second coils are disposed on the rotor such that each coil axis of the one or more second coils extends along the rotation axis direction of the rotor. The one or more first coils and the one or more second coils are disposed on the stator and the rotor, respectively, in such a manner as to closely oppose each other in a state where the rotor is at a predetermined rotation angle position. The one or more first coils are arranged to induce a voltage in response to a relative position with respect to the one or more second coils.

In the one aspect, the one or more first coils and the one or more second coils are disposed on the stator and the rotor, respectively, in such a manner as to closely oppose each other in a state where the rotor is at the predetermined rotation angle position, and the one or more first coils are arranged to induce a voltage in response to the relative position with respect to the one or more second coils. Therefore, in the one aspect, it is possible to detect a rotation angle position of the rotor by detecting a voltage of the one or more first coils.

The one or more first coils and the one or more second coils are disposed on the stator and the rotor, respectively, such that each coil axis of the one or more first coils and one or more second coils extends along the rotation axis direction of the rotor and in such a manner as to closely oppose each other in a state where the rotor is at the predetermined rotation angle position. Therefore, the rotating electrical machine tends not to increase in size.

In the one aspect, each of the one or more first coils and one or more second coils may include a coil conductor of a spiral shape in plan view.

In a configuration in which each of the one or more first coils and one or more second coils includes the coil conductor, magnetic coupling between the one or more first coils and the one or more second coils increases when the one or more first coils and the one or more second coils closely oppose each other. Therefore, this configuration improves detection accuracy of the rotation angle position of the rotor.

The one aspect may include a temperature sensor arranged such that an electrical resistance of the temperature sensor changes in response to a temperature of the permanent magnet, a third coil that is electrically connected to the temperature sensor, and an element arranged to output an electrical signal responding to a voltage induced by the one or more first coils. In this case, the temperature sensor and the third coil are disposed on the rotor.

The one or more first coils excite the third coil when the one or more first coils and the third coil closely oppose each other. Therefore, electric power is supplied to the third coil. The voltage generated in the one or more first coils change in response to a change in the electrical resistance of the temperature sensor because the electrical resistance of the temperature sensor electrically connected to the third coil changes in response to the temperature of the permanent magnet. The element outputs an electrical signal responding to the voltage induced by the one or more first coils. Therefore, the electrical signal output from the element changes in response to the temperature of the permanent magnet. Consequently, even in a case where the temperature sensor is disposed on the rotor, a configuration including the temperature sensor, the third coil, and the element outputs the temperature information regarding the temperature of the permanent magnet appropriately and simply.

The one aspect may include a capacitive component that forms an LC resonance circuit together with the third coil.

A configuration including a capacitive component senses the change in the electrical resistance of the temperature sensitively.

In the one aspect, the third coil may include a coil conductor of a spiral shape in plan view.

In a configuration in which the third coil include the coil conductor, magnetic coupling between the one or more first coils and the third coil increases when the one or more first coils and the third coil closely oppose each other. Therefore, this configuration outputs the temperature information regarding the temperature of the permanent magnet more appropriately.

The present invention will become more fully understood from the detailed description given hereinafter and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating embodiments of the invention, are given by way of illustration only, since various changes and modifications within the spirit and scope of the invention will become apparent to those skilled in the art from this detailed description.

BRIEF DESCRIPTION OF THE DRAWINGS

FIGS. 6A and 6B are diagrams illustrating examples of a change in voltage amplitude of a coil;

DETAILED DESCRIPTION OF EMBODIMENTS

Figure 1:
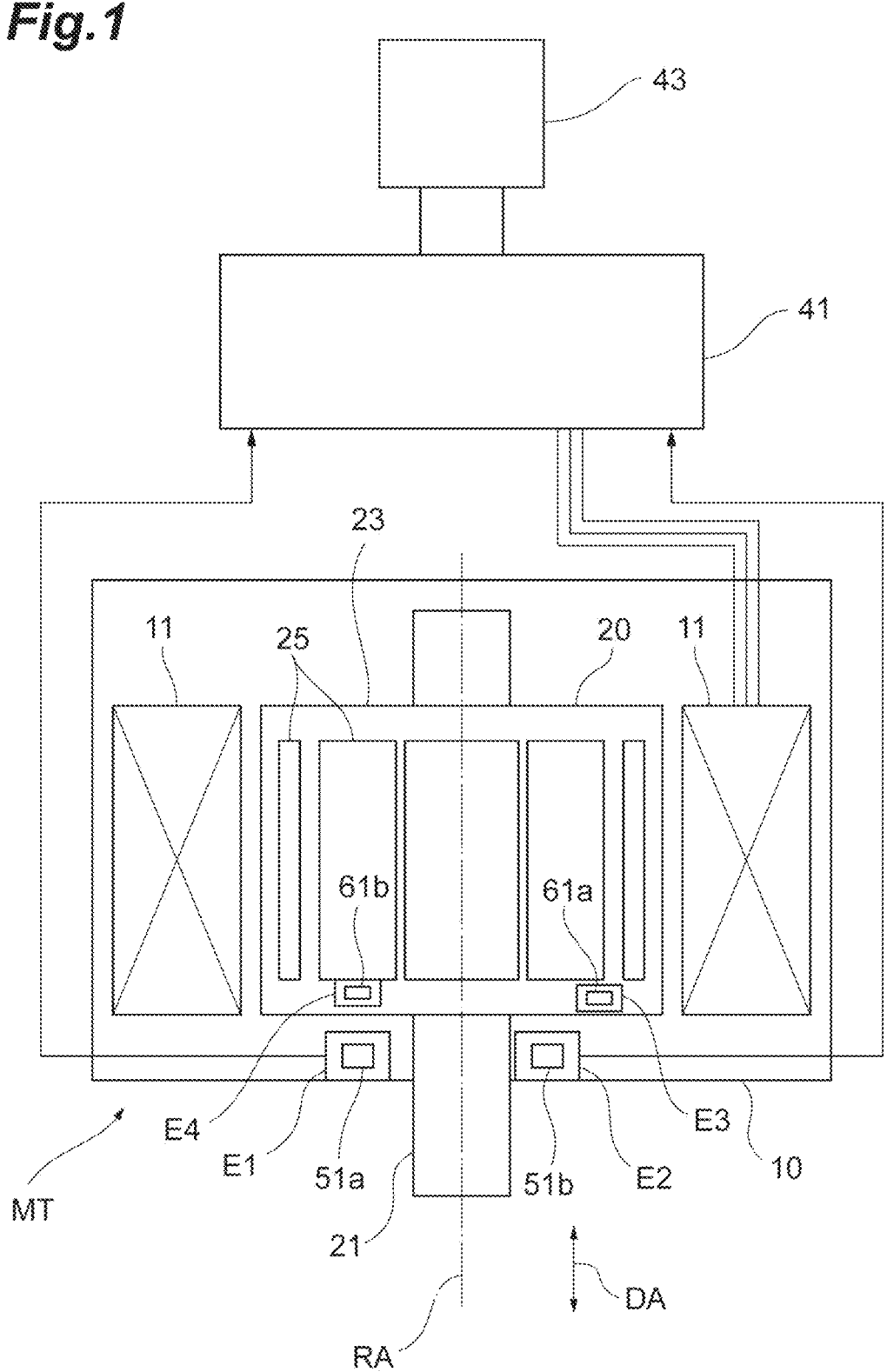
FIG. 1 is a schematic diagram illustrating a configuration of a rotating electrical machine according to an embodiment.

Hereinafter, embodiments of the present invention will be described in detail with reference to the accompanying drawings. In the following description, the same elements or elements having the same functions are denoted with the same reference numerals and overlapped explanation is omitted.

Figure 3A:
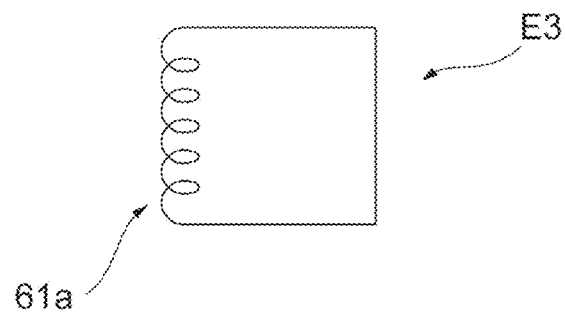
FIGS. 3A, 3B, and 3C are circuit diagrams illustrating examples of each element unit.
Figure 3B:
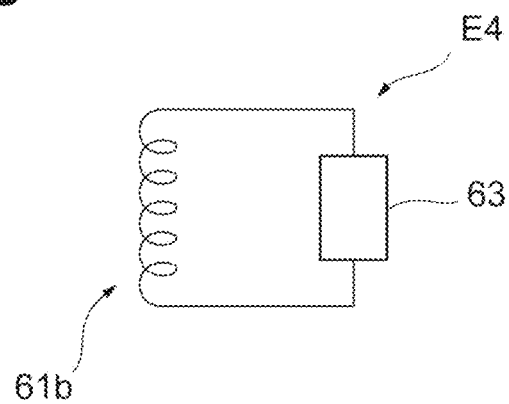
Figure 4A:
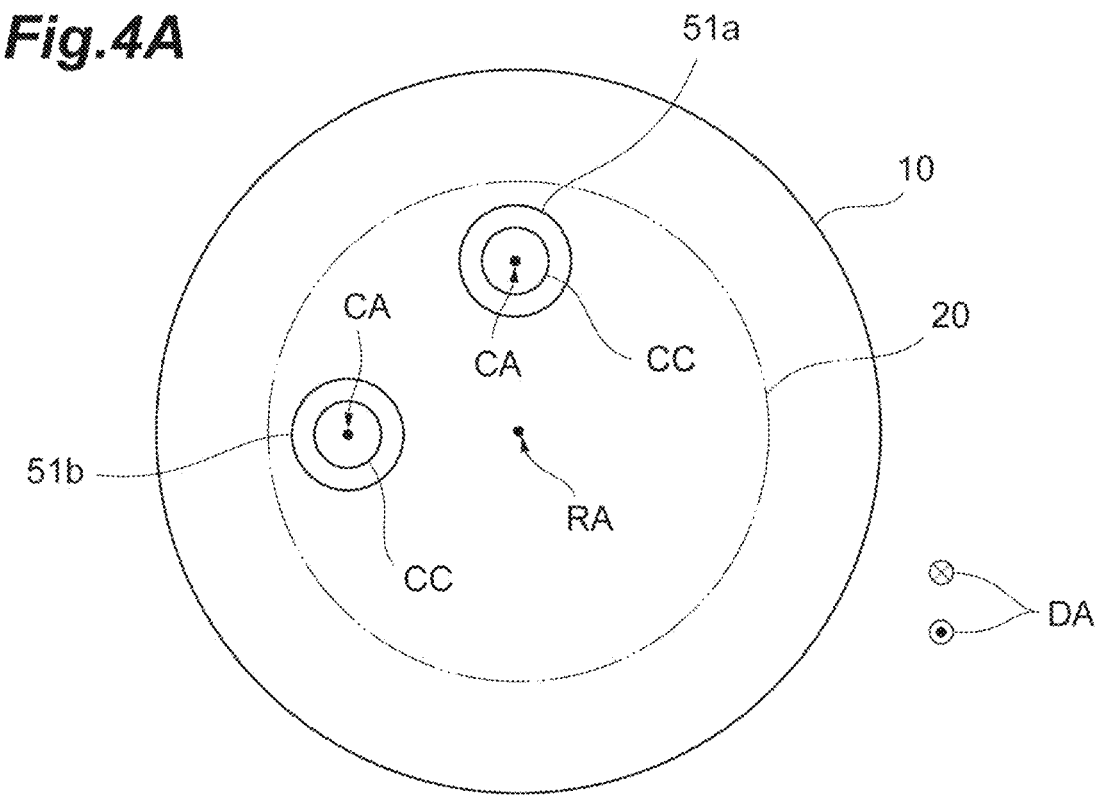
FIGS. 4A and 4B are schematic diagrams illustrating examples of a position of a coil included in each element unit.
Figure 4B:
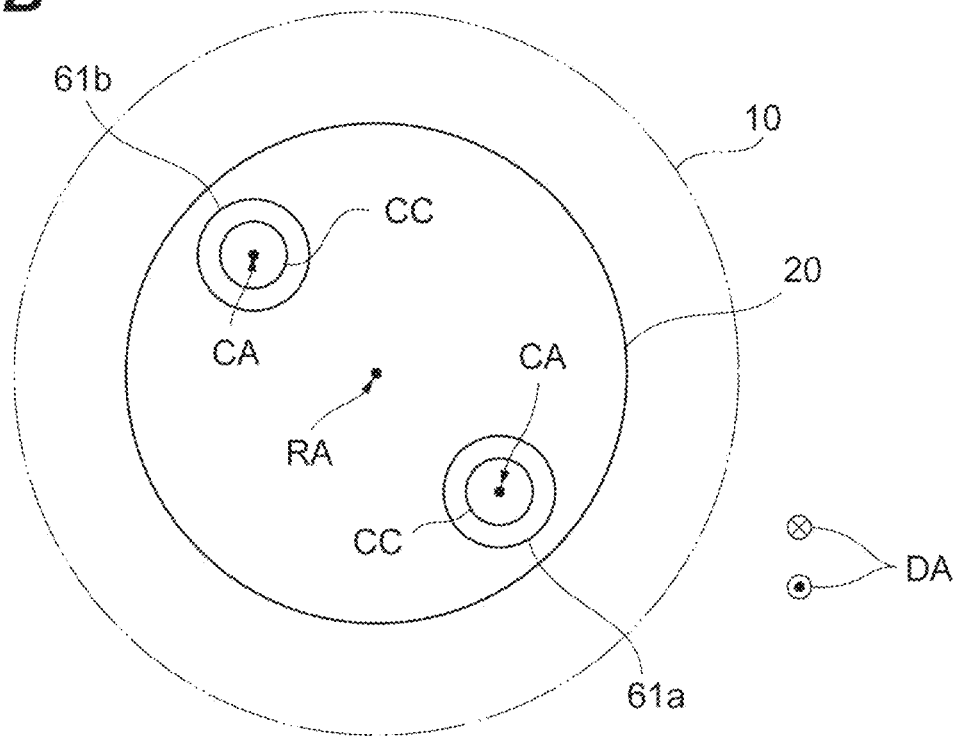
Figure 5A:
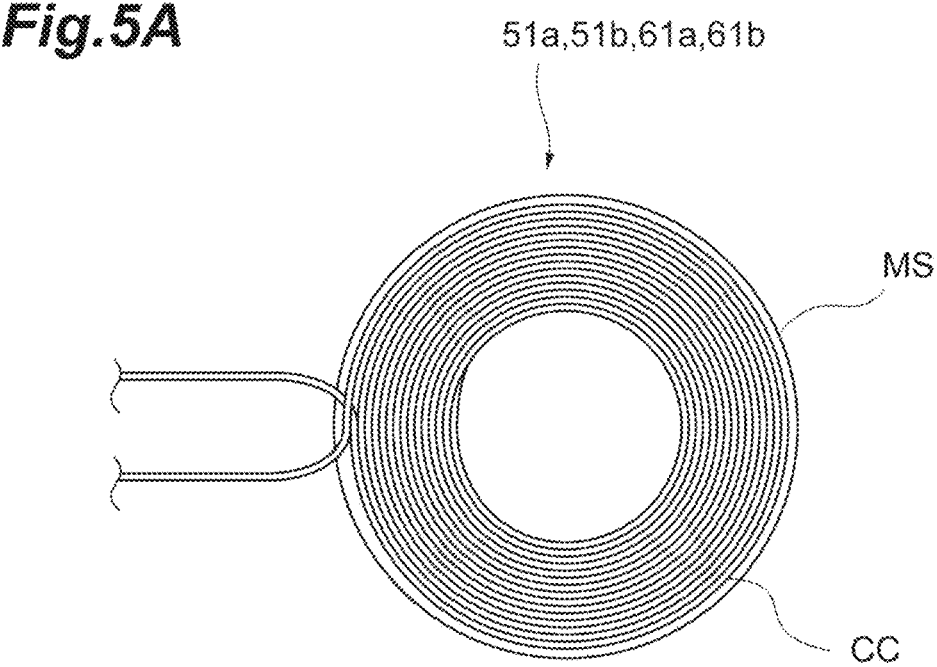
FIGS. 5A and 5B are diagrams illustrating a configuration of a coil included in each element unit.
Figure 5B:
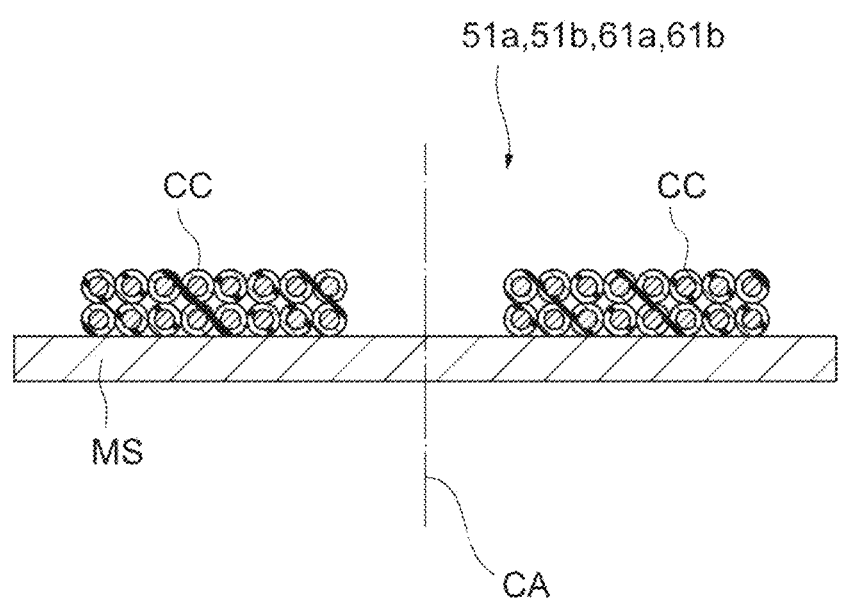

A configuration of a rotating electrical machine MT according to an embodiment will be described with reference to FIGS. 1 to 5B. FIG. 1 is a schematic diagram illustrating the configuration of the rotating electrical machine according to the embodiment. FIGS. 2A, 2B, 3A, 3B, and 3C are circuit diagrams illustrating examples of each element unit. FIGS. 4A and 4B are schematic diagrams illustrating examples of a position of a coil included in each element unit. FIGS. 5A and 5B are diagrams illustrating a configuration of a coil included in each element unit.

The rotating electrical machine MT is, for example, a motor. Examples of a motor include an IPM motor and an SPM motor. The rotating electrical machine MT includes a stator 10 and a rotor 20. The rotor 20 is located inside the stator 10.

The rotor 20 includes a shaft 21, a rotor core 23, and a plurality of permanent magnets 25. The shaft 21 has a columnar shape. The rotor core 23 has a cylindrical shape. A shaft hole into which the shaft 21 is fitted is formed in the rotor core 23. The shaft 21 and the rotor core 23 rotate integrally around a central axis of the shaft 21. Each permanent magnet 25 is disposed on the rotor core 23 such that an extension direction of each permanent magnet 25 is parallel to the central axis of the shaft 21. The extension direction of each permanent magnet 25 is approximately parallel to the central axis of the shaft 21. The central axis of the shaft 21 is a rotation axis RA of the rotor 20. A direction in which the rotation axis RA of the rotor 20 extends is the rotation axis direction DA of the rotor 20. The plurality of permanent magnets 25 are disposed at equal angle intervals with respect to the rotation axis RA of the rotor 20.

In a case where the rotating electrical machine MT is an IPM motor, the plurality of permanent magnets 25 are disposed in the rotor core 23. In a case where the rotating electrical machine MT is an SPM motor, the plurality of permanent magnets 25 are disposed on the surface of the rotor core 23. Each permanent magnet 25 includes a rare earth-based permanent magnet. Each permanent magnet 25 is, for example, a neodymium-based sintered magnet. Each permanent magnet 25 may be a sintered magnet other than the rare earth-based permanent magnet, or may be a magnet other than the sintered magnet. Examples of a magnet other than the sintered magnet include a bonded magnet and a hot pressed magnet.

The stator 10 includes a cylindrical stator core (not illustrated) and a plurality of coils 11. The stator core is disposed to surround an outer periphery of the rotor 20. An air gap having a uniform width is formed between the stator 10 and the rotor 20. The stator core holds the plurality of coils 11. Each coil 11 is disposed on an inner peripheral side of the stator core. The plurality of coils 11 are disposed at equal angle intervals with respect to the rotation axis RA of the rotor 20.

The rotating electrical machine MT is connected to a control circuit 41. The control circuit 41 is connected to a power supply 43. The control circuit 41 adjusts a drive current from the power supply 43, and supplies a three-phase AC current to each coil 11. The control circuit 41 controls a value of the three-phase AC current supplied to each coil 11. The control circuit 41 includes, for example, an inverter circuit. Each coil 11 forms a rotating magnetic field for rotating the rotor 20 due to supplying the three-phase AC current to each coil 11. The power supply 43 includes, for example, an electrical energy storage device. Examples of the electrical energy storage device include a secondary battery and a capacitor.

A plurality of element units E1, E2, E3, and E4 are disposed on the rotating electrical machine MT. That is, the rotating electrical machine MT includes the plurality of element units E1, E2, E3, and E4. In the embodiment, four element units E1, E2, E3, and E4 are disposed on the rotating electrical machine MT.

Figure 2A:
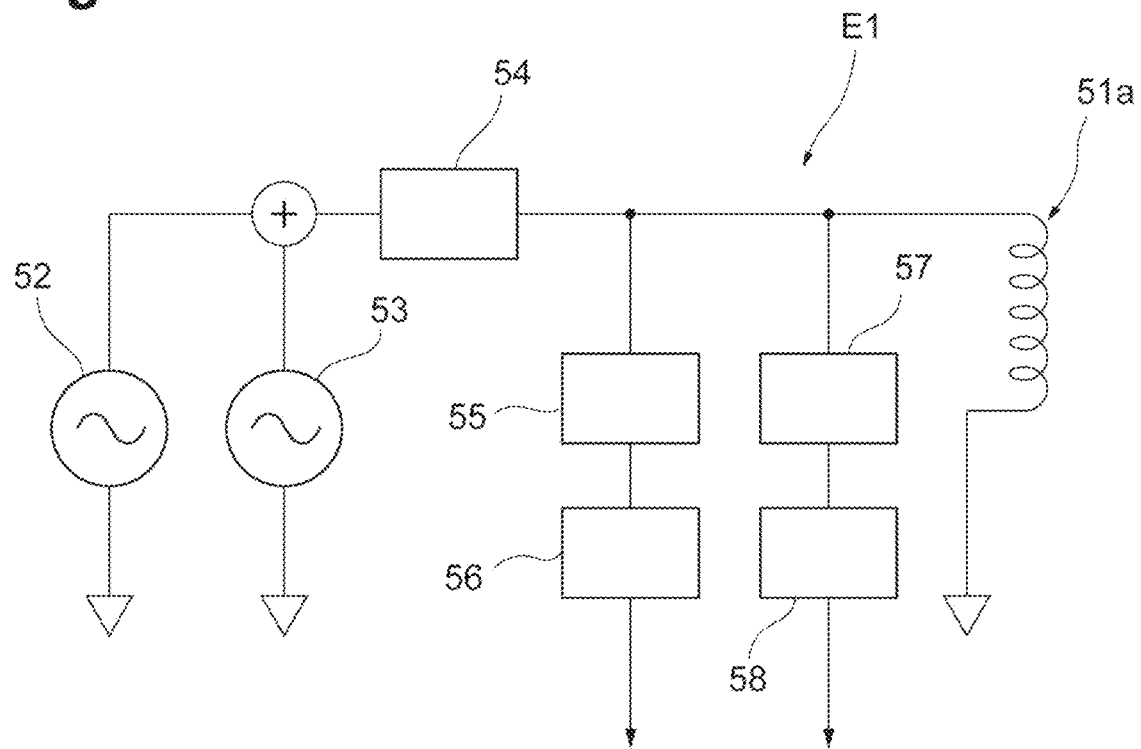
FIGS. 2A and 2B are circuit diagrams illustrating examples of each element unit.
Figure 2B:
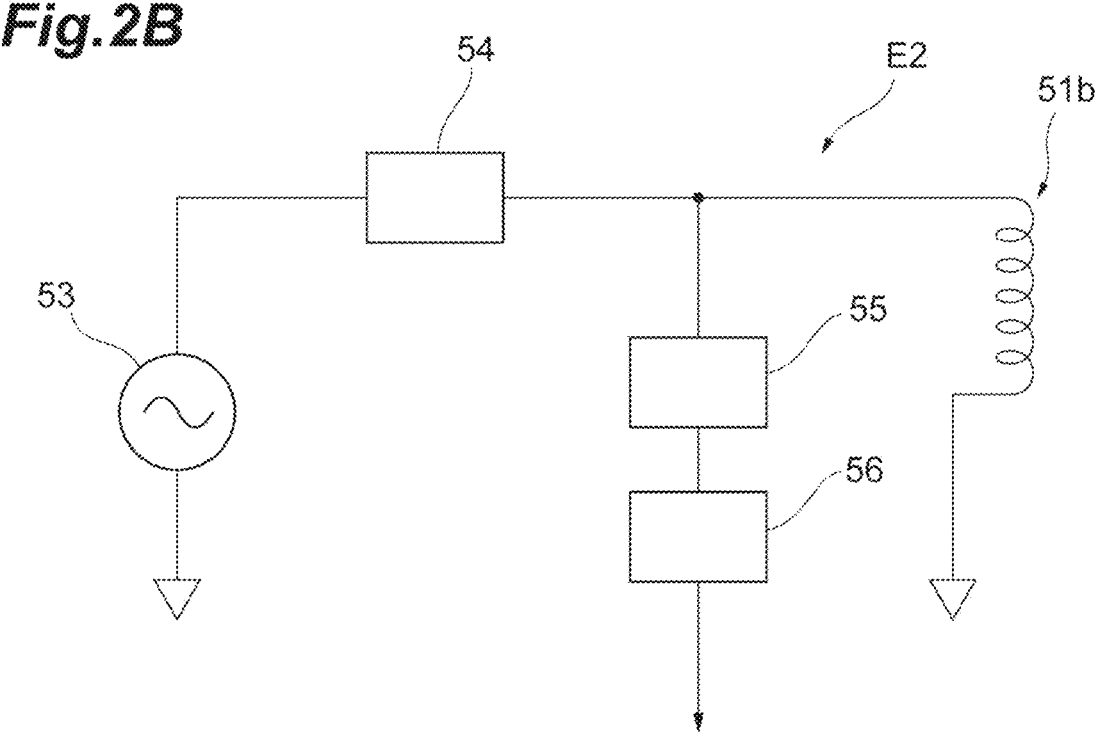

The element unit E1 includes a coil 51a as illustrated in FIG. 2A. The element unit E2 includes a coil 51b as illustrated in FIG. 2B. Each of the element units E1 and E2 is connected to the control circuit 41. The element unit E3 includes a coil 61a as illustrated in FIG. 3A. The element unit E4 includes a coil 61b as illustrated in FIG. 3B.

The coil 51a of the element unit E1 and the coil 51b of the element unit E2 are disposed on the stator 10, as illustrated in FIG. 4A. Each of the coils 51a and 51b is disposed on the stator core, for example. The coil 61a of the element unit E3 and the coil 61b of the element unit E4 are disposed on the rotor 20, as illustrated in FIG. 4B. The coils 51a and 51b and the coils 61a and 61b are disposed on the stator 10 and the rotor 20, respectively, in such a manner as to closely oppose each other in a state where the rotor 20 is at a predetermined rotation angle position. In the embodiment, the coils 51a and 51b and the coils 61a and 61b closely oppose each other in a direction approximately parallel to the rotation axis direction DA in a state where the rotor 20 is at the predetermined rotation angle position.

As illustrated in FIG. 4A, the coil 51a and the coil 51b are located to be separated from each other by a predetermined first angle in a rotation angle of the rotor 20. As illustrated in FIG. 4B, the coil 61a and the coil 61b are located to be separated from each other by a predetermined second angle in the rotation angle of the rotor 20. The first angle is, for example, about 90° (or about 270°), and the second angle is, for example, about 180°. The coils 51a, 51b, 61a, and 61b are disposed in the rotating electrical machine MT. That is, the rotating electrical machine MT includes the coils 51a, 51b, 61a, and 61b.

For example, in a case where each of the coils 51a and 51b constitutes a first coil, the coil 61a constitutes a second coil and the coil 61b constitutes a third coil. The number of coils 51a and 51b included in the element unit E1 and the element unit E2 is different from the number of coils 61a included in the element unit E3. In the embodiment, the number of coils 51a and 51b included in the element unit E1 and the element unit E2 is larger than the number of coils 61a included in the element unit E3. The number of coils 51a and 51b included in the element unit E1 and the element unit E2 is two, and the number of coils 61a included in the element unit E3 is one. For example, in a case where the number of coils 51a and 51b included in the element unit E1 and the element unit E2 is a first number, the number of coils 61a included in the element unit E3 is a second number.

As illustrated in FIG. 2A, the element unit E1 includes an AC power supply 52, an AC power supply 53, a resistance element 54, a low pass filter 55, a voltage monitor 56, a high pass filter 57, and a voltage monitor 58. As illustrated in FIG. 2B, the element unit E2 includes an AC power supply 53, a resistance element 54, a low pass filter 55, and a voltage monitor 56. Each of the element units E1 and E2 is connected to the control circuit 41. The AC power supply 52, the AC power supply 53, the resistance element 54, the low pass filter 55, the voltage monitor 56, the high pass filter 57, and the voltage monitor 58 are disposed outside the rotating electrical machine MT. The low pass filter 55, the voltage monitor 56, the high pass filter 57, and the voltage monitor 58 may be disposed in the rotating electrical machine MT, for example.

First, a configuration of the element unit E1 will be described.

The AC power supply 52 is electrically connected to the coil 51a, and applies an AC signal (AC voltage) having a predetermined first frequency to the coil 51a. The AC power supply 53 is also electrically connected to the coil 51a and applies an AC signal (AC voltage) having a predetermined second frequency to the coil 51a. The first frequency and the second frequency are different. In the embodiment, the first frequency is higher than the second frequency. The first frequency is, for example, 100 kHz. The second frequency is, for example, 20 kHz. In the element unit E1, the AC signal having the first frequency and the AC signal having the second frequency are superimposed. The AC signal having the first frequency and the AC signal having the second frequency that are superimposed are applied to the coil 51a. The first and second frequencies are 10 to 200 times the driving frequency of the rotating electrical machine MT.

The voltage monitor 56 is electrically connected to the coil 51a through the low pass filter 55. The low pass filter 55 allows a voltage signal in a predetermined frequency band including the second frequency to pass therethrough. The voltage monitor 56 monitors the voltage signal that has passed through the low pass filter 55 and is in the predetermined frequency band including the second frequency, among voltage signals in which the voltage induced by the coil 51a is reflected. The voltage monitor 56 outputs an electrical signal to the control circuit 41, the electrical signal corresponding to the voltage signal in the predetermined frequency band including the second frequency. In the element unit E1, the resistance element 54 is inserted between the AC power supplies 52 and 53 and the coil 51a.

The voltage monitor 58 is electrically connected to the coil 51a through the high pass filter 57. The high pass filter 57 allows a voltage signal in a predetermined frequency band including the first frequency to pass therethrough. The voltage monitor 58 monitors a voltage signal that has passed through the high pass filter 57 and is in the predetermined frequency band including the first frequency, among voltage signals in which the voltage induced by the coil 51a is reflected. The voltage monitor 58 outputs an electrical signal to the control circuit 41, the electrical signal corresponding to the voltage signal in the predetermined frequency band including the first frequency.

Next, a configuration of the element unit E2 will be described.

The AC power supply 53 is electrically connected to the coil 51b and applies an AC signal (AC voltage) having a predetermined second frequency to the coil 51b. As described above, the second frequency is, for example, 20 kHz. In the element unit E2, the AC signal having the second frequency is applied to the coil 51b, and the AC signal having the first frequency is not applied to the coil 51b. In the element unit E2, the resistance element 54 is inserted between the AC power supply 53 and the coil 51b.

The voltage monitor 56 is electrically connected to the coil 51b through the low pass filter 55. The low pass filter 55 allows a voltage signal in a predetermined frequency band including the second frequency to pass therethrough. The voltage monitor 56 monitors a voltage signal that has passed through the low pass filter 55 and is in the predetermined frequency band including the second frequency, among voltage signals in which the voltage induced by the coil 51b is reflected. The voltage monitor 56 outputs an electrical signal to the control circuit 41, the electrical signal corresponding to the voltage signal in the predetermined frequency band including the second frequency.

Next, a configuration of the element unit E3 will be described.

As described above, the element unit E3 has the coil 61a. Both ends of the coil 61a are short-circuited.

Next, a configuration of the element unit E4 will be described.

The element unit E4 includes a temperature sensor 63. The temperature sensor 63 is disposed on the rotor 20. The temperature sensor 63 is disposed on at least one permanent magnet 25 of the plurality of permanent magnets 25. In the embodiment, the temperature sensor 63 is disposed on only one permanent magnet 25. The temperature sensor 63 is disposed to be in contact with the permanent magnet 25. The temperature sensor 63 may be disposed in a vicinity of the permanent magnet 25. In this case, the temperature sensor 63 may be separated from the permanent magnet 25. An electrical resistance of the temperature sensor 63 changes in response to the temperature of the permanent magnet 25. The electrical resistance of the temperature sensor 63 decreases as the temperature of the permanent magnet 25 rises. The temperature sensor 63 includes, for example, a thermistor. The temperature sensor 63 includes, for example, an NTC thermistor. The coil 61b is electrically connected to the temperature sensor 63. Both ends of the coil 61b are electrically connected to both ends of the temperature sensor 63.

As illustrated in FIGS. 5A and 5B, each of the coils 51a, 51b, 61a, and 61b includes a magnetic substrate MS and a coil conductor CC. FIG. 5A is a plan view of the coil, and FIG. 5B is a diagram illustrating a cross-sectional configuration of the coil.

The magnetic substrate MS is a plate-shaped member made of a magnetic material. The magnetic substrate MS is made of ferrite, for example. The planar shape of the magnetic substrate MS may be circular or polygonal. The coil conductor CC is disposed on the magnetic substrate MS. The coil conductor CC has a spiral shape in plan view. That is, the coil conductor CC is spirally wound on the magnetic substrate MS. In the embodiment, the coil conductor CC is wound in two layers. For example, the coil conductor CC is wound from an outer side to an inner side in the first layer, and is then wound from an inner side to an outer side in the second layer. The coil conductor CC includes, for example, a conductive wire coated for insulation. The coil conductor CC may be wound in a circular loop shape or may be wound in a polygonal loop shape.

Each of the coils 51a and 51b is disposed on the stator 10 such that a coil axis CA extends along the rotation axis direction DA of the rotor 20. Each of the coils 51a and 51b is disposed on the stator 10 such that the magnetic substrate MS is located between the stator 10 and the coil conductor CC. Each of the coils 61a and 61b is disposed on the rotor 20 such that a coil axis CA extends along the rotation axis direction DA of the rotor 20. Each of the coils 61a and 61b is disposed on the rotor 20 such that the magnetic substrate MS is located between the rotor 20 and the coil conductor CC. The magnetic substrate MS reduces an influence of a metallic component located in a vicinity of each of the coils 51a, 51b, 61a, and 61b.

In a state where the coils 51a and 51b and the coils 61a and 61b closely oppose other, the corresponding coil conductors CC do not necessarily have to entirely oppose each other in the rotation axis direction DA. That is, it is not necessary for the corresponding coil conductors CC to entirely overlap each other when viewed from the rotation axis direction DA. For example, in a state where the coils 51a and 51b and the coils 61a and 61b closely oppose each other, parts of the corresponding coil conductors CC may overlap each other when viewed from the rotation axis direction DA.

A magnetic flux responding to the AC voltage applied from the AC power supplies 52 and 53 is generated in the coil 51a of the element unit E1. A magnetic flux responding to the AC voltage applied from the AC power supply 53 is generated in the coil 51b of the element unit E2.

When the rotor 20 rotates and the coil 51a and the coil 61a closely oppose each other, the magnetic flux generated in the coil 51a passes through the coil 61a. When the magnetic flux generated in the coil 51a passes through the coil 61a, electric power responding to the magnetic flux passing through the coil 61a is generated in the coil 61a. That is, the coil 51a excites the coil 61a to supply the electric power to the coil 61a.

When the rotor 20 rotates and the coil 51b and the coil 61a closely oppose each other, the magnetic flux generated in the coil 51b passes through the coil 61a. When the magnetic flux generated in the coil 51b passes through the coil 61a, electric power responding to the magnetic flux passing through the coil 61a is generated in the coil 61a. That is, the coil 51b excites the coil 61a to supply the electric power to the coil 61a.

Short-circuiting both ends of the coil 61a changes the magnetic flux generated in the coil 51a when the coil 61a closely opposes the coil 51a. Therefore, the voltage generated in the coil 51a changes. That is, the coil 51a induces a voltage in response to the relative position with respect to the coil 61a. The voltage generated in the coil 51a decreases when the coil 61a closely opposes the coil 51a. The voltage generated in the coil 51a increases when the coil 61a is separated from the coil 51a.

The magnetic flux generated in the coil 51b changes when the coil 61a closely opposes the coil 51b. Therefore, the voltage generated in the coil 51b changes. That is, the coil 51b induces a voltage in response to the relative position with respect to the coil 61a. The voltage generated in the coil 51b decreases when the coil 61a closely faces the coil 51b. The voltage generated in the coil 51a increases when the coil 61a is separated from the coil 51b.

FIGS. 6A and 6B illustrate examples of a change in voltage amplitude of each of the coils 51a and 51b. FIG. 6A is a diagram illustrating a change in the voltage amplitude in the coil 51a of the element unit E1. FIG. 6B is a diagram illustrating a change in the voltage amplitude in the coil 51b of the element unit E2.

The voltage amplitude in each of the coils 51a and 51b changes in response to the relative position between each of the coils 51a and 51b and the coil 61a as described above. The state where the voltage amplitude decreases is where each of the coils 51a and 51b and the coil 61a closely oppose each other. The difference between the phase of the voltage amplitude change in the coil 51a and the phase of the voltage amplitude change in the coil 51b approximately corresponds to the first angle described above. In FIGS. 6A and 6B, the envelope of each voltage amplitude is illustrated by a broken line.

In each of the element units E1 and E2, the voltage monitor 56 monitors the voltage signal input through the low pass filter 55. That is, the voltage monitor 56 monitors the voltage signal in the predetermined frequency band including the second frequency. This voltage signal is the signal in which the voltage induced by the corresponding coils 51a and 51b is reflected. The change in the voltage monitored by the voltage monitor 56 corresponds to a change in the relative position between each of the coils 51a and 51b and the coil 61a, that is, a change in the rotation angle position of the rotor 20. Therefore, the electrical signal output from the voltage monitor 56, that is, the output signal of the voltage monitor 56 includes position information regarding the rotation angle position of the rotor 20. Each of the element units E1 and E2 outputs the electrical signal corresponding to the voltage signal in the predetermined frequency band including the second frequency, among the voltage signals in which the voltages induced by the corresponding coils 51a and 51b are reflected, as the position information.

The electrical signal output from each voltage monitor 56 is input to the control circuit 41. The control circuit 41 calculates a rotation state of the rotor 20 based on the electrical signal output from each voltage monitor 56. The rotation state of the rotor 20 includes, for example, a rotation direction of the rotor 20 and a rotation angle position of the rotor 20. For example, the rotation direction of the rotor 20 is calculated based on the phase delay and lead of the voltage amplitude change in the coil 51b with respect to the phase of the voltage amplitude change in the coil 51a. The rotation angle position of the rotor 20 is calculated based on the voltage amplitude change in each of the coils 51a and 51b, that is, a timing at which the voltage amplitude in each of the coils 51a and 51b decreases.

The magnetic flux responding to the AC voltage applied from the AC power supplies 52 and 53 is generated in the coil 51a of the element unit E1. When the rotor 20 rotates and the coil 51a of the element unit E1 and the coil 61b of the element unit E4 closely oppose each other, the magnetic flux generated in the coil 51a passes through the coil 61b. When the magnetic flux generated in the coil 51a passes through the coil 61b, electric power responding to the magnetic flux passing through the coil 61b is generated in the coil 61b. That is, the coil 51a excites the coil 61b to supply electric power to the coil 61b.

The electrical resistance of the temperature sensor 63 changes in response to the temperature of the permanent magnet 25. The magnetic flux generated in the coil 51a changes in response to the change in the electrical resistance of the temperature sensor 63. Therefore, the voltage generated in the coil 51a changes. That is, the coil 51a induces a voltage because the coil 61b closely opposes the coil 51a. As the temperature of the permanent magnet 25 rises and the electrical resistance of the temperature sensor 63 decreases, the voltage generated in the coil 51a decreases. As the temperature of the permanent magnet 25 drops and the electrical resistance of the temperature sensor 63 increases, the voltage generated in the coil 51a increases.

Figure 7A:
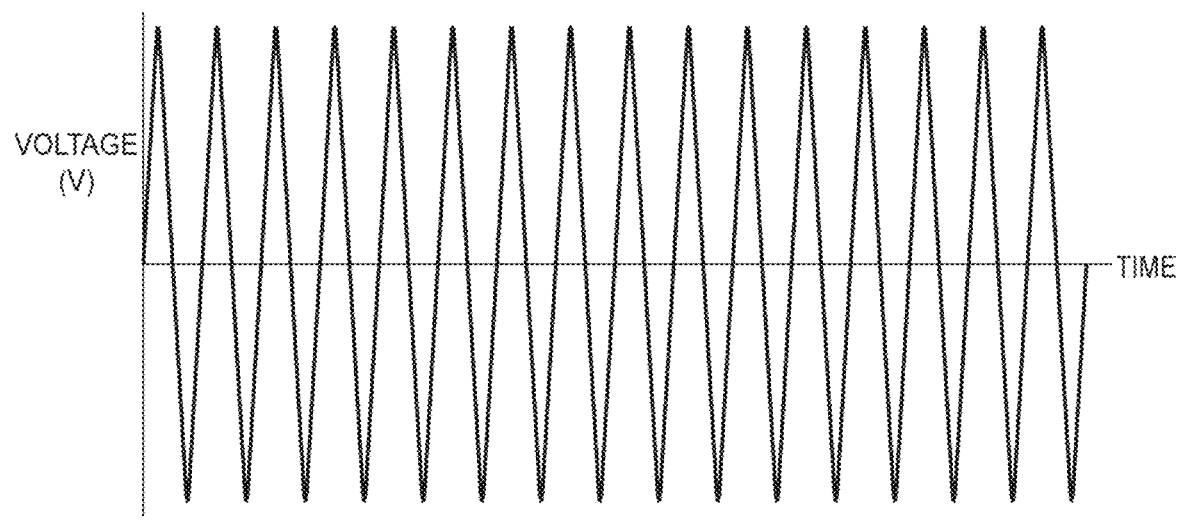
FIGS. 7A and 7B are diagrams illustrating voltage amplitude of a coil.
Figure 7B:
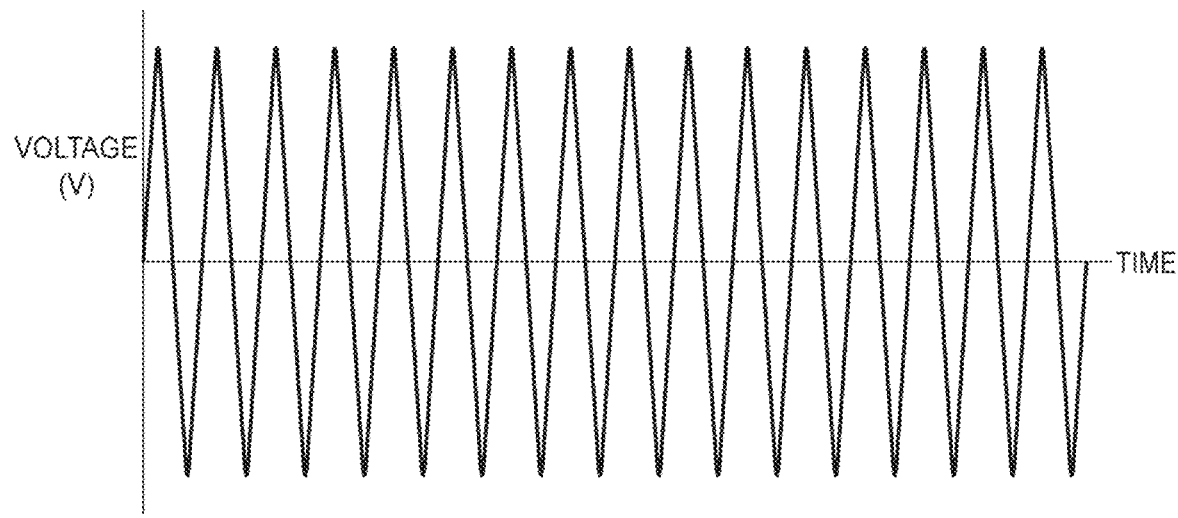

FIGS. 7A and 7B illustrate examples of the voltage amplitude of the coil 51a. FIG. 7A is a diagram illustrating the voltage amplitude of the coil 51a in a case where the temperature of the permanent magnet 25 is low. FIG. 7B is a diagram illustrating the voltage amplitude of the coil 51a in a case where the temperature of the permanent magnet 25 is high.

As described above, the voltage amplitude in the coil 51a changes in response to the temperature of the permanent magnet 25. The voltage amplitude in the coil 51a in a case where the temperature of the permanent magnet 25 is low is larger than that in a case where the temperature of the permanent magnet 25 is high.

The voltage monitor 58 monitors the voltage signal input through the high pass filter 57. That is, the voltage monitor 58 monitors the voltage signal in the predetermined frequency band including the first frequency. This voltage signal is a signal in which the voltage induced by the coil 51a is reflected. The voltage monitor 58 is an element that outputs an electrical signal responding to the voltage induced by the coil 51a of the element unit E1.

A change in the voltage monitored by the voltage monitor 58 corresponds to a change in the electrical resistance of the temperature sensor 63, that is, a change in the temperature of the permanent magnet 25. Therefore, the electrical signal output from the voltage monitor 58, that is, the output signal of the voltage monitor 58 includes temperature information regarding the temperature of the permanent magnet 25. The element unit E1 outputs the electrical signal corresponding to the voltage signal in the predetermined frequency band including the first frequency, among the voltage signals in which the voltage induced by the coil 51a is reflected, as the temperature information. Consequently, information regarding the temperature of the permanent magnet 25 is wirelessly transmitted between the element unit E1 and the element unit E4.

The electrical signal output from the voltage monitor 58 is input to the control circuit 41. The control circuit 41 controls a drive state of the rotating electrical machine MT based on the electrical signal output from the voltage monitor 58. For example, the control circuit 41 controls the drive state of the rotating electrical machine MT as follows. In a case where the control circuit 41 determines that the electrical signal output from the voltage monitor 58 indicates that the temperature of the permanent magnet 25 has risen to a predetermined first threshold value, the control circuit 41 controls a supply electric power in such a manner as to limit a rotation speed of the rotating electrical machine MT. In a case where the control circuit 41 determines that the electrical signal output from the voltage monitor 58 indicates that the temperature of the permanent magnet 25 has dropped to a predetermined second threshold value, the control circuit 41 controls the supply electric power in such a manner as to release a limitation on the rotation speed of the rotating electrical machine MT. In this case, the second threshold value is less than the first threshold value, for example.

The control circuit 41 may control the drive state of the rotating electrical machine MT as follows. That is, the control circuit 41 may control the drive frequency input to the rotating electrical machine MT, for example. In a case where the control circuit 41 determines that the electrical signal output from the voltage monitor 58 indicates that the temperature of the permanent magnet 25 has risen to a predetermined first threshold value, the control circuit 41 controls to decrease the drive frequency in such a manner as to limit the rotation speed of the rotating electrical machine MT. In a case where the control circuit 41 determines that the electrical signal output from the voltage monitor 58 indicates that the temperature of the permanent magnet 25 has dropped to a predetermined second threshold value, the control circuit 41 controls to increase the drive frequency in such a manner as to release a limitation on the rotation speed of the rotating electrical machine MT. Also in this case, the second threshold value is less than the first threshold value, for example.

As described above, in the embodiment, the number of coils 51a and 51b included in the element unit E1 and the element unit E2 is different from the number of coils 61a included in the element unit E3. The coils 51a and 51b and the coil 61a are disposed on the stator 10 and the rotor 20, respectively, in such a manner as to closely oppose each other in a state where the rotor 20 is at the predetermined rotation angle position. The coils 51a and 51b induce a voltage in response to the relative position with respect to the coil 61a. Therefore, according to the embodiment, it is possible to detect the rotation angle position of the rotor 20 by detecting the voltage of the coils 51a and 51b.

In the rotating electrical machine MT, the coils 51a and 51b of the element units E1 and E2 and the coil 61a of the element unit E3 contribute to detection of the rotation angle position of the rotor 20.

The coils 51a and 51b and the coil 61a are disposed on the stator 10 and the rotor 20, respectively, such that the coil axes CA extend along the rotation axis direction DA of the rotor 20 and in such a manner as to closely oppose each other in a state where the rotor 20 is at the predetermined rotation angle position. Therefore, the rotating electrical machine MT tends not to increase in size.

In the rotating electrical machine MT, the coils 51a and 51b and the coil 61a each include the coil conductor CC of the spiral shape in plan view.

Therefore, magnetic coupling between the coils 51a and 51b and the coil 61a increases when the coils 51a and 51b and the coil 61a closely oppose each other. As a result, the rotating electrical machine MT improves detection accuracy of the rotation angle position of the rotor 20.

In the rotating electrical machine MT, the element unit E4 includes the coil 61b and the temperature sensor 63.

In the rotating electrical machine MT, the coil 51a excites the coil 61b when the coil 51a and the coil 61b closely oppose each other. Therefore, electric power is supplied to the coil 61b. The electrical resistance of the temperature sensor 63 electrically connected to the coil 61b changes in response to the temperature of the permanent magnet 25. The voltage generated in the coil 51a changes in response to the change in the electrical resistance of the temperature sensor 63. The voltage monitor 58 outputs the electrical signal responding to the voltage induced by the coil 51a. Therefore, the electrical signal output from the voltage monitor 58 changes in response to the temperature of the permanent magnet 25. Consequently, even in a case where the temperature sensor 63 is disposed on the rotor 20, the rotating electrical machine MT outputs the temperature information regarding the temperature of the permanent magnet 25 appropriately and simply.

In the rotating electrical machine MT, the coil 51a of the element unit E1 and the coil 61b of the element unit E4 contribute to detection of the temperature of the permanent magnet 25.

In the rotating electrical machine MT, the coil 61b also includes the coil conductor CC of the spiral shape in plan view.

Therefore, magnetic coupling between the coil 51a and the coil 61b increases when the coil 51a and the coil 61b closely face each other. Consequently, the rotating electrical machine MT outputs the temperature information regarding the temperature of the permanent magnet 25 more appropriately.

Figure 3C:
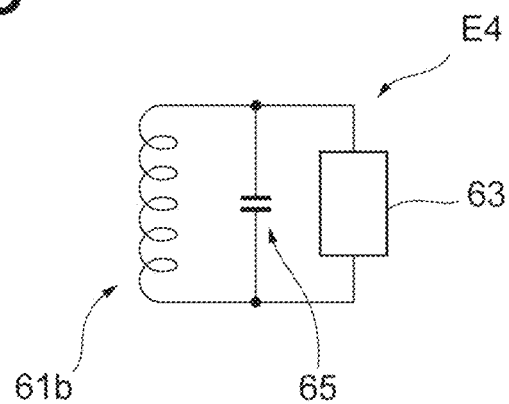

As illustrated in FIG. 3C, the element unit E4 may include a capacitive component 65. The capacitive component 65 is disposed on the rotor 20. The coil 61b and the capacitive component 65 form an LC resonance circuit. The capacitive component 65 is inserted to be connected in parallel to the coil 61b, for example. The capacitive component 65 may be an electronic component, such as a capacitor, or may be parasitic capacitance of the coil 61b.

The configuration in which the element unit E4 includes the capacitive component 65 senses the change of the temperature sensor 63 more sensitively.

Although the embodiment and modifications of the present invention have been described above, the present invention is not necessarily limited to the embodiment and modifications, and the embodiment can be variously changed without departing from the scope of the invention.

The rotating electrical machine MT may not include the element unit E4. In this case, the element unit E1 may not include the AC power supply 52, the high pass filter 57, and the voltage monitor 58. Even in a case where the rotating electrical machine MT does not include the element unit E4, it is possible to detect the rotation angle position of the rotor 20 in the rotating electrical machine MT.

Figure 8A:
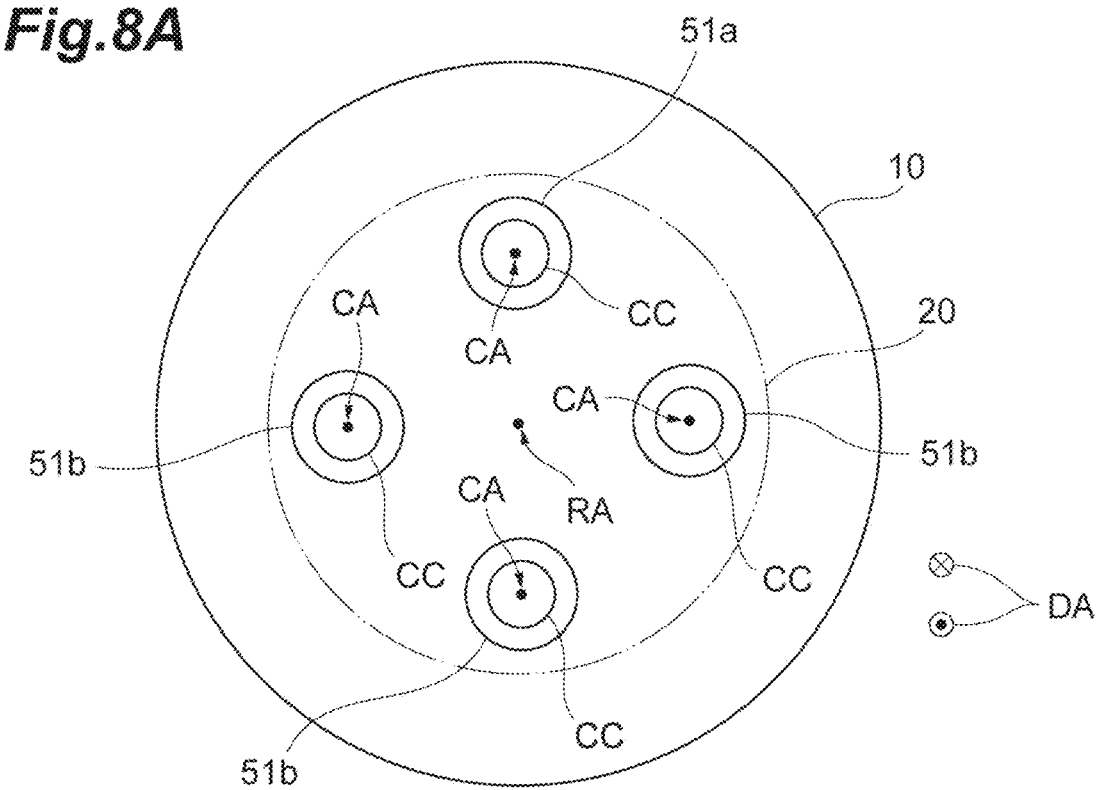
FIGS. 8A and 8B are schematic diagrams illustrating other examples of a position of a coil included in each element unit.
Figure 8B:
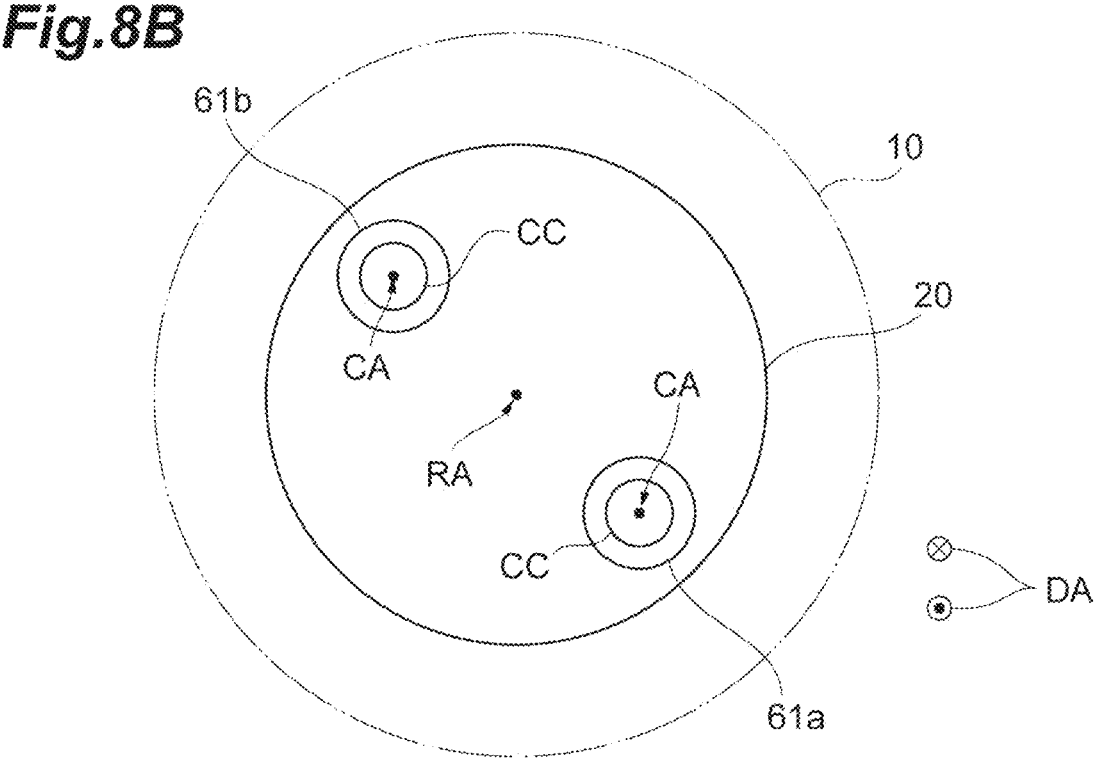

The number of element units E2 may be plural. In this case, as illustrated in FIGS. 8A and 8B, a plurality of coils 51b are disposed on the stator 10. FIGS. 8A and 8B are schematic diagrams illustrating other examples of a position of a coil included in each element unit.

In the configuration illustrated in FIG. 8A, one element unit E1 and three element units E2 are disposed on the rotating electrical machine MT. The rotating electrical machine MT includes one coil 51a and three coils 51b. Also in this case, the rotating electrical machine MT includes one coil 61a and one coil 61b, as illustrated in FIG. 8B.

The number of element units E2 is not limited to three. The coils 51a and 51b are located at predetermined third angles in the rotation angle of the rotor 20. In the configuration illustrated in FIG. 8A, the third angle is about 90°. The plurality of coils 51a and 51b are disposed on the stator 10 at approximately equal angular intervals.

Figure 9A:
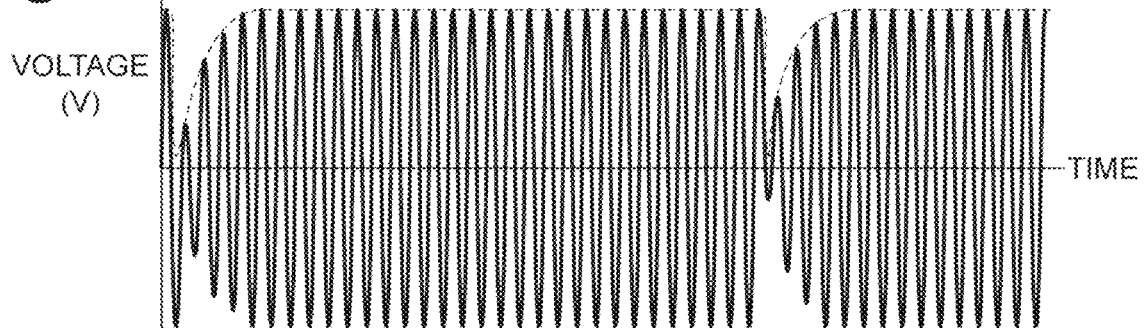
FIGS. 9A, 9B, 9C, and 9D are diagrams illustrating other examples of a change in voltage amplitude of a coil.
Figure 9B:
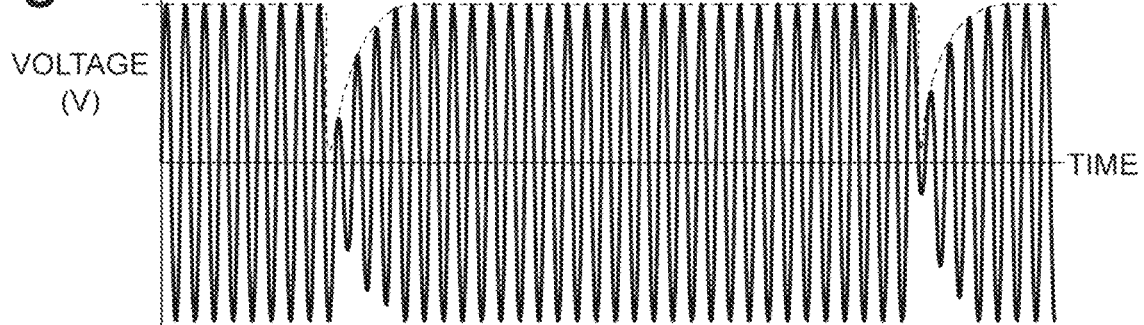
Figure 9C:
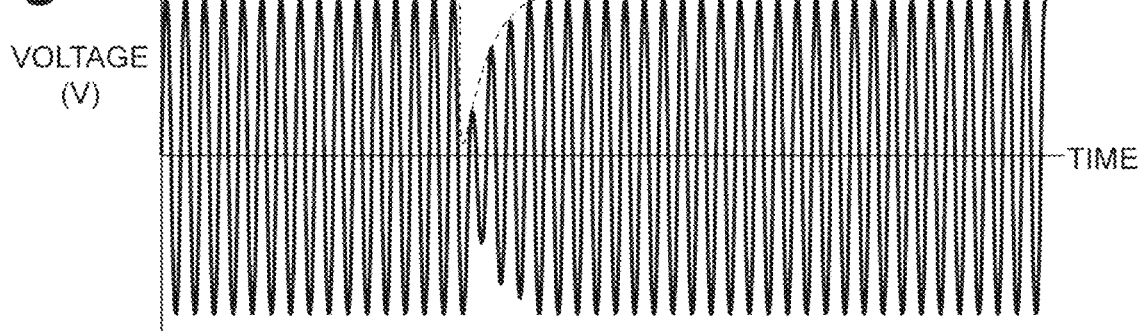
Figure 9D:
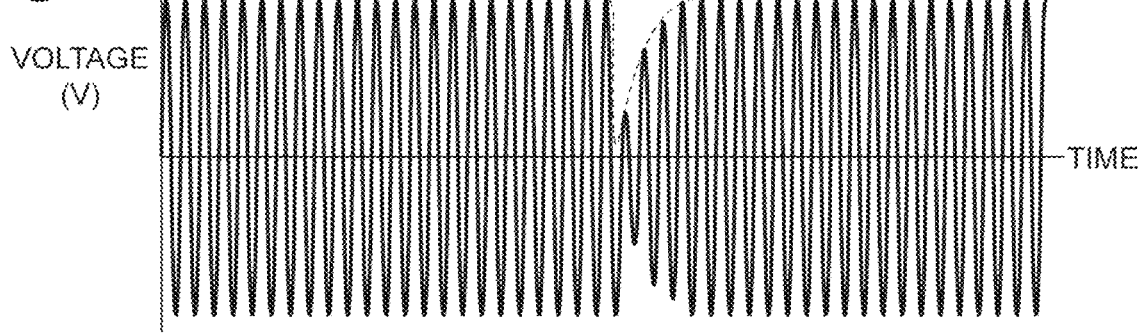

FIGS. 9A, 9B, 9C, and 9D illustrate other examples of a change in voltage amplitude of each of the coils 51a and 51b. FIG. 9A is a diagram illustrating a change in voltage amplitude in the coil 51a of the element unit E1. FIGS. 9B to 9D are diagrams illustrating a change in voltage amplitude in the coil 51b of the element unit E2. Also in FIGS. 9A, 9B, 9C, and 9D, an envelope of each voltage amplitude is indicated by a broken line.

As described above, the rotation angle position of the rotor 20 is calculated based on a timing at which the voltage amplitude in each of the coils 51a and 51b decreases. Therefore, as the number of element units E2 increases, the detection accuracy of the rotation angle position of the rotor 20 improves.

The number of coils 61a included in the element unit E3 may be larger than the number of coils 51a and 51b included in the element unit E1 and the element unit E2. Also in this case, in the rotating electrical machine MT, it is possible to detect the rotation angle position of the rotor 20, and the increase in size is suppressed.

What is claimed is:

1. A rotating electrical machine, comprising:
   a stator;
   a rotor with a permanent magnet;
   a first number of first coils disposed on the stator such that a coil axis thereof extends along a rotation axis direction of the rotor;
   a second number of second coils disposed on the rotor such that a coil axis thereof extends along the rotation axis direction of the rotor, the second number being different from the first number,
     wherein the first coil and the second coil are disposed on the stator and the rotor, respectively, in such a manner as to oppose each other in a state where the rotor is at a predetermined rotation angle position, and
     the first coil is arranged to induce a voltage in response to a relative position with respect to the second coil;
   a temperature sensor that is disposed on the rotor and is arranged such that an electrical resistance of the temperature sensor changes in response to a temperature of the permanent magnet;
   a third coil that is disposed on the rotor and is electrically connected to the temperature sensor; and
   an element arranged to output an electrical signal responding to a voltage induced by the first coil.

2. The rotating electrical machine according to claim 1, wherein each of the first and second coils includes a coil conductor of a spiral shape in plan view.

3. The rotating electrical machine according to claim 1, further comprising:
   a capacitive component that forms an LC resonance circuit together with the third coil.

4. The rotating electrical machine according to claim 1, wherein the third coil includes a coil conductor of a spiral shape in plan view.

5. A rotating electrical machine, comprising:
   a stator;
   a rotor with a permanent magnet;
   a first number of one or more first coils disposed on the stator such that each coil axis of the one or more first coils extends along a rotation axis direction of the rotor; and
   a second number of one or more second coils disposed on the rotor such that each coil axis of the one or more second coils extends along the rotation axis direction of the rotor, the second number being different from the first number,
   wherein the one or more first coils and the one or more second coils are disposed on the stator and the rotor, respectively, in such a manner as to oppose each other in a state where the rotor is at a predetermined rotation angle position,
   the one or more first coils are arranged to induce a voltage in response to a relative position with respect to the one or more second coils, and
   the one or more second coils include both ends directly short-circuited.

6. The rotating electrical machine according to claim 5, wherein each of the one or more first coils and one or more second coils includes a coil conductor of a spiral shape in plan view.

7. The rotating electrical machine according to claim 5, further comprising:
   a temperature sensor that is disposed on the rotor and is arranged such that an electrical resistance of the temperature sensor changes in response to a temperature of the permanent magnet;
   a third coil that is disposed on the rotor and is electrically connected to the temperature sensor; and
   an element arranged to output an electrical signal responding to a voltage induced by the one or more first coils.

8. The rotating electrical machine according to claim 7, further comprising:
   a capacitive component that forms an LC resonance circuit together with the third coil.

9. The rotating electrical machine according to claim 7, wherein the third coil includes a coil conductor of a spiral shape in plan view.

\* \* \* \* \*